Feb. 13, 1962 R. C. EDSON 3,021,488
MONOSTABLE MULTIVIBRATOR RESPONSIVE TO POSITIVE
AND NEGATIVE TRIGGER PULSES FROM SINGLE SOURCE
Filed Dec. 29, 1944
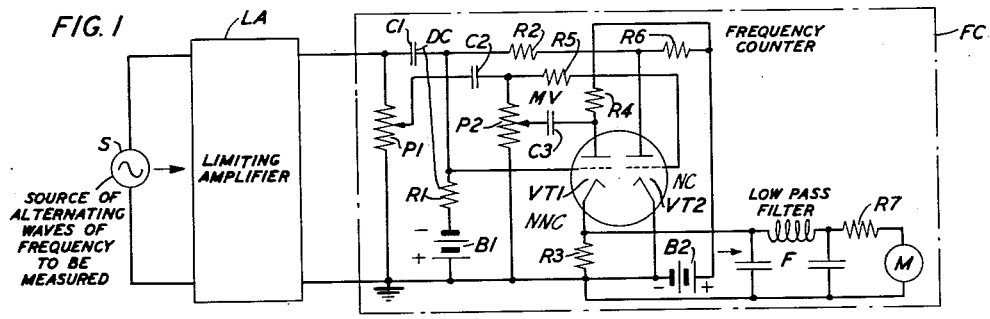
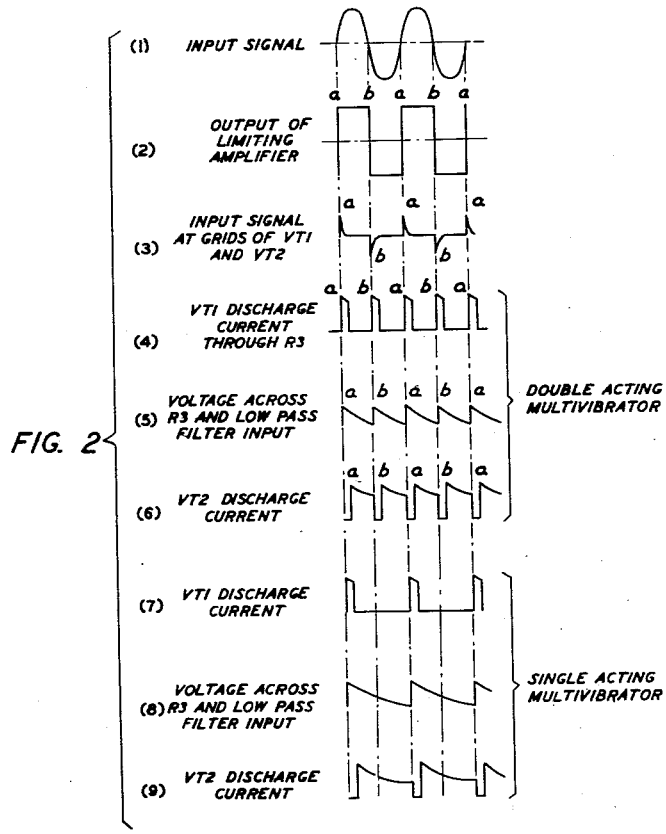
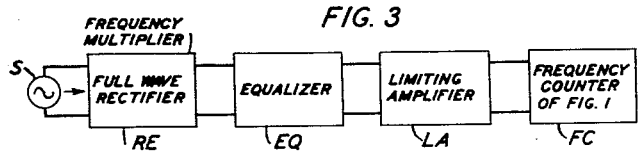
INVENTOR
R.C. EDSON
BY
Earl C. Laughlin
ATTORNEY

United States Patent Office 3,021,488
Patented Feb. 13, 1962

3,021,488
MONOSTABLE MULTIVIBRATOR RESPONSIVE TO POSITIVE AND NEGATIVE TRIGGER PULSES FROM SINGLE SOURCE
Robert C. Edson, West Orange, N.J., assignor to Bell Telephone Laboratories, Incorporated, New York, N.Y., a corporation of New York
Filed Dec. 29, 1944, Ser. No. 570,405
1 Claim. (Cl. 328—196)

The invention relates to wave responsive devices and particularly to circuits for indicating or measuring the frequency of alternating waves or for counting electric wave impulses.

The copending patent application of R. R. Riesz, Serial No. 570,407, filed December 29, 1944, discloses a simple and economical circuit arrangement for providing a precise indication or measurement of the frequency of electric waves, particularly adapted for use in the pitch control channel of a system for analyzing, synthesizing and modifying speech, of the "vocoder" type, such as disclosed in the United States patents to H. W. Dudley, No. 2,151,091, issued March 21, 1939, or to R. R. Riesz, No. 2,183,248, issued December 12, 1939. This circuit arrangement employs a single-trip multivibrator of novel design triggered by sharp voltage pulses obtained by transmitting a wave of the frequency to be measured through a limiting amplifier and a condenser-resistance differentiating circuit of very small time constant, to produce an output voltage the average value or direct current component of which is linearly proportional to the frequency of the input wave over a wide range of frequencies and is substantially independent of variations in the amplitude or shape of that wave. The frequency of the input wave is indicated or measured by applying this average or direct current voltage component to a suitable meter through a low-pass filter utilized for filtering out its small transient variations or ripples.

An object of the invention is to improve such a frequency measuring and indicating circuit, particularly from the standpoint of increasing its speed of operation and sensitivity, and easing the filtering requirements, with the addition of comparatively few and simple circuit elements.

A general object of the invention is to provide a precise measurement of the frequency of electric oscillations, for example, of the fundamental frequency of a repeated electric signal wave, such as a speech wave.

Another object is to derive from a speech wave a slowly varying direct current signal the magnitude of which is proportional to the fundamental pitch of the speaker's voice.

These objects are attained in accordance with one embodiment of the invention by modifying the circuits of the above-identified patent application so as to make the single-trip multivibrator circuit thereof double-acting, that is, to make it operate on both positive and negative polarities of the sharp voltage peaks or spikes in the control wave. In a modified arrangement in accordance with the invention further improvement in operation is attained by multiplying the frequency of the control wave applied to the multivibrator, for example, by means of a full-wave rectifier and equalizer or slope circuit inserted in the measuring circuit in front of the limiting amplifier.

The various objects and features of the invention will be better understood from the following detailed description when read in conjunction with the accompanying drawing in which:

FIG. 1 shows schematically a frequency measuring circuit embodying one form of the invention;

FIG. 2 shows curves used for illustrating the operation of the circuit of FIG. 1; and FIG. 3 shows diagrammatically an alternative form of the invention.

In the circuit of FIG. 1, an alternating signal wave of the frequency to be measured, such as a speech wave, which may be of fundamental sine wave form such as shown by the idealized curve (1) of FIG. 2, received from a source S is transmitted through a limiting amplifier LA to transform it into an alternating wave of the same frequency but of substantially rectangular or square-wave shape as shown by the curve in (2) of FIG. 2. The limiting amplifier LA may be of any of the well-known types, for example, of the type employing one or more three-electrode amplifying vacuum tube stages with a large resistance in series with the grid circuit of the first vacuum tube stage, such as disclosed in the aforementioned copending patent application of R. R. Riesz, adapted for cutting off the positive and negative voltage peaks from the applied waves.

The rectangular or square-shaped wave in the output of the limiting amplifier LA is transmitted through a differentiating circuit DC comprising a condenser C1 and a resistance R1 connected in series across the output of that amplifier, the values of which are selected to provide a very small time constant. This, in effect, develops a voltage across the resistance R1 of that circuit which is the derivative of the applied square wave, the voltage wave containing in successive half cycles very sharp positive and negative voltage peaks or spikes, due to the charging and discharging currents to C1 through R1. This peaked voltage wave, which is shown in idealized form in the curve of (3) of FIG. 2, is utilized for triggering-off a single-trip multivibrator MV operating in combination with a meter M and the low-pass filter F in a direct current output circuit as a frequency or pulse counter FC.

The multivibrator MV includes the two three-electrode amplifying vacuum tubes VT1 and VT2, which may be contained in a single envelope as shown. The cathodes of the tubes VT1 and VT2 are heated to incandescence from any suitable source (not shown), which may be a direct current battery. Space current is supplied from the common plate battery B2 in parallel to the anodes of the tubes VT1 and VT2 through the individual equivalent series resistances R4 and R6, respectively. The anode of the tube VT1 is coupled through a condenser C3, the upper resistance portion of a potentiometer P2 and the resistance R5 in series to the control grid of the tube VT2, and the anode of the tube VT2 is coupled through the series resistance R2 to the control grid of the tube VT1. The control grid circuit of the tube VT1 includes the resistor R3, which is connected between the cathode of that tube and ground, the negative grid biasing battery B1 and the resistance R1 in series. The control grid circuit of the tube VT2 includes the upper and lower resistance portions of potentiometer P2 and resistance R5 in series. The control grid of the tube VT1 is connected to the differentiating circuit DC at a point between the resistance R1 and the condenser C1. The control grid of the tube VT2 is connected through the resistance R5 and the condenser C2 to the variable arm of the potentiometer P1 the resistance portion of which is shunted across the output of the limiting amplifier LA in front of condenser C1. A meter M is connected across the cathode resistor R3 of the multivibrator tube VT1 through the series resistance R7 and the low-pass filter F.

With no signal input from the output of the limiting amplifier LA, the vacuum tube VT1 is maintained in the non-conducting condition, preventing self-oscillation of the multivibrator MV, by the negative bias resulting from the battery B1, the battery B2 and the voltage drops in resistances R1, R2 and R6. With no signal input, the multivibrator tube VT2 is maintained in the conducting condition since its grid bias is zero, and there is a voltage drop produced in resistance R6 due to its plate current. Thus, the potential on the grid of tube VT1 is dependent on the current flow through tube VT2 and the resulting voltage drop in the resistance R6 in the anode circuit of the latter tube. Since the tube VT1 is nonconducting for the condition of no signal input, there will be no output from the low-pass filter F, due to the absence of any potential across the cathode resistor R3.

When there is a signal input to the frequency measuring circuit from the source S, the alternate positive and negative signal voltage peaks or spikes in the voltage wave, shown in (3) of FIG. 2, appearing in the resistance R1 will be applied to the grid of the multivibrator tube VT1. On the positive polarity a with respect to ground of this signal input to the grid of tube VT1, the normal negative grid biasing potential will be overcome and the tube will become conducting so that space current will start to flow through its discharge path and resistances R4 and R3 in series. The sudden change thus produced in the potential across resistance R4 will cause a pulse, similar to that shown in (3) of FIG. 2, to be transmitted to the grid of the tube VT2 through a path including the condenser C3, the upper resistance portion of potentiometer P2 and resistance R5 in series, the polarity of this pulse being such that this grid becomes sufficiently negative to drive tube VT2 to the nonconducting condition. This in turn causes the grid of tube VT1 to be made less negative (or more positive) because of the removal of the voltage drop across resistance R6 when plate current flow through the tube VT2 ceases. Thus, each positive polarity voltage peak or spike of the voltage wave, as shown in (3) of FIG. 2, applied to the grid of tube VT1 will start conduction in the tube which will continue due to the action of tube VT2 even after this positive spike, which is of short duration, is removed from the input of the tube VT1. Conduction through the tube VT1 will continue as long as tube VT2 is non-conducting. This time interval is determined by the time constant of the condenser C3 and the lower resistance portion of potentiometer P2 connected to ground. At the end of this time interval, the negative voltage across potentiometer P2 will have been reduced to the point that tube VT2 becomes conducting again. This will cause the positive voltage across the resistance R1, and thus the positive potential on the grid of the tube VT1 to be reduced so that the latter tube again becomes nonconducting, thus returning the multivibrator to its normal nonoscillating condition. By suitable selection of the time constant of the circuit consisting of the condenser C3 and the portion of the resistance in potentiometer P2 connecting this condenser to ground, the negative pulse driving the vacuum tube VT2 to the nonconducting condition is made long enough to maintain that condition until after the positive spike is removed from the grid of VT1. The restoration of the vacuum tube VT1 to the nonconducting condition is dependent, therefore, solely on the time the tube VT2 is held in the nonconducting condition by the associated RC circuit. The above-described action will be repeated when the next positive spike appears across the resistance R1. The current pulses transmitted through tube VT1, and thus through the cathode resistance R3, in response to each positive spike applied to the grid of the tube are indicated at a in (4) of FIG. 2.

On the change in amplitude of the input signal from the source S, which is opposite to that resulting in the positive a spikes of the wave in the output of the differentiating circuit DC, as shown in (3) of FIG. 2, a b negative spike will appear and will be applied with a negative polarity to ground to the grid of the multivibrator tube VT2 through a transmission path including the potentiometer P1, the condenser C2, the potentiometer P2 and the resistance R5. A similar negative pulse will be applied through condenser C1 to the grid of the multivibrator VT1, which will increase the negative bias already present on that grid. Since the tube VT1 is already in the nonconducting condition, no action will take place from the latter pulse. The action of the negative pulse applied to the grid of the tube VT2, however, will cause that tube to be changed from the conducting to the nonconducting condition, which is the same result as is obtained when the tube VT1 is rendered conducting in response to the application of a positive pulse to its grid, as described above. When tube VT2 is made nonconducting, the tube VT1 will be made conducting due to the increase in the positive potential on its grid resulting from the reduction in potential across the resistance R6 in the anode circuit of tube VT2, which occurs when the latter tube is made nonconducting. The tube VT2 will remain nonconducting and thus the tube VT1 will remain conducting, for the period of time determined by the time constant of the condenser C3 and the lower resistance portion of potentiometer P2 connecting that condenser to ground.

Therefore, for each change in polarity of the rectangular-shaped wave, shown in (2) of FIG. 2, in the output of the limiting amplifier LA, a pulse of current will be transmitted through the cathode resistance R3 of the tube VT1 and thus through the low-pass filter F. The discharge current of the tube VT1 resulting from the application of an input signal wave is shown by the curve (4) in FIG. 2, the current due to the opposite half cycles being respectively designated as a and b. As shown by that curve, during the time that the tube VT1 is conducting for either half cycle, a pulse of constant amplitude and width appears across the resistance R3 and likewise across the input of the low-pass filter F. If the frequency of the input wave from the source S is increased, the amplitude and width of the pulses through R3 will remain constant, but the number of pulses will increase, with the result that the direct current output of the low-pass filter F will increase. If the input frequency is doubled, the width and amplitude of the pulses will remain constant, but the number of pulses will be doubled, and therefore the rectified current in the output of the filter F will be doubled to give a reading for the meter M which is proportional to frequency. The voltage appearing across the resistance R3 and the input to the low-pass filter F is shown in (5) of FIG. 2, and the discharge current of the tube VT2 during its conducting period is shown in (6) of FIG. 2.

The cut-off frequency of the low-pass filter F is selected to be less than the frequency of the signal wave from the source S, to be measured, and such that the variation with time in the frequency of the signal wave is slow enough to be transmitted by that filter.

If only the a (positive) polarity changes of the input voltage were effective to trigger off the multivibrator MV of FIG. 1, the discharge current through the tubes VT1 and VT2 and the voltage across resistance R3 and the input to the low-pass filter F would only include the a portions of the waves shown in (4), (6) and (5), as indicated in the curves of (7), (9) and (8), respectively of FIG. 2, and the low-pass filter F would be required to smooth out a lower frequency than when both polarities of the input signal are used for triggering the multivibrator as accomplished by the circuit of FIG. 1 as described above. As the difference between the frequency of the input signal and the fluctuation or variation in this frequency becomes smaller, it is more difficult to smooth out the rectified ripple and still retain the desired variation in the output signal. Therefore, the double-acting multivibrator circuit of the invention makes it possible to use a low-pass filter F with a higher frequency cut-off; or alternatively to obtain a better filtering action with a given filter, or to obtain an output signal which has a greater variation for the same amount of ripple.

As indicated diagrammatically in FIG. 3, further improvement from the standpoint of filtering may be obtained by the use of a frequency multiplier, for example, of a full-wave rectifier RE, and a suitable equalizer or slope circuit EQ, in front of the limiting amplifier LA and the double-acting multivibrator frequency counter FC of the invention shown in FIG. 1. The rectifier RE will rectify and double the frequency of the signal wave from the source S before it is transformed into the square-wave form. The equalizer EQ is of the well-known type in which the component elements are selected to provide a loss increasing with frequency so as to reduce the amplitude level of the harmonics in the transmitted rectified wave with respect to those of the fundamental double frequency components. This will effectively double the effectiveness of the circuit from a filtering standpoint with the addition of simple, economical pieces of apparatus.

Various modifications of the circuits illustrated and described, which are within the spirit and scope of the invention, will occur to persons skilled in the art.

What is claimed is:

In combination, means to produce an alternating voltage wave containing a sharp positive voltage peak and a sharp negative voltage peak in alternate half cycles thereof, a pair of electric discharge devices each having a heated cathode, an anode and a control grid, control grid-cathode circuits for said devices, anode-cathode circuits for said devices including a common source of anode voltage, a capacitor connected between the anode of one device and the control grid of the second device, a resistor connected between the anode of said second device and the control grid of said one device, a second resistor connected in common to the control grid-cathode circuit and anode-cathode circuit of said one device between the cathode thereof and ground, a third resistor connected between the grid and cathode of said second device, the grid terminal of said capacitor being connected to ground through at least a portion of said third resistor, means biasing the control grids of said devices so that said one device is normally non-conducting and said second device is normally conducting, means to apply said voltage wave to the control grid-cathode circuits both of said devices, the conducting conditions of said devices being reversed in response to each applied voltage peak for a time interval determined primarily by the time constant of said capacitor and said portion of said third resistor, which is selected so as to make the conducting time of said one device longer than each of said voltage peaks and shorter than the time spacing between successive voltage peaks in said wave and an output circuit for said devices connected across said second resistor.

References Cited in the file of this patent

UNITED STATES PATENTS

| | | |
|---|---|---|
| 2,119,389 | Hunt | May 31, 1938 |
| 2,252,457 | Cockrell | Aug. 12, 1941 |
| 2,260,933 | Cooper | Oct. 28, 1941 |
| 2,325,927 | Wilbur | Aug. 3, 1943 |
| 2,337,328 | Hathaway | Dec. 21, 1943 |
| 2,352,082 | De Rosa | June 20, 1944 |
| 2,366,076 | Wilbur | Dec. 26, 1944 |

OTHER REFERENCES

Review of Scientific Instruments, July 1938, "New Vacuum Tube Counting Circuits," by Reich, pp. 222, 223.